United States Patent
Abell, III et al.

(10) Patent No.: US 7,282,242 B2
(45) Date of Patent: Oct. 16, 2007

(54) MULTILAYER POLYMER STRUCTURE

(75) Inventors: W. Robert Abell, III, Wilmington, DE (US); E. David Santoleri, Glen Mills, PA (US); Jeffrey S. Armour, Potomac Falls, VA (US)

(73) Assignee: Ferro Corporation, Cleveland, OH (US)

( * ) Notice: Subject to any disclaimer, the term of this patent is extended or adjusted under 35 U.S.C. 154(b) by 541 days.

(21) Appl. No.: 10/421,661

(22) Filed: Apr. 23, 2003

(65) Prior Publication Data

US 2004/0213934 A1 Oct. 28, 2004

(51) Int. Cl.
*B05D 7/00* (2006.01)

(52) U.S. Cl. .................... 427/407.1; 427/402

(58) Field of Classification Search ......... 427/407.1, 427/402
See application file for complete search history.

(56) References Cited

U.S. PATENT DOCUMENTS

| | | | |
|---|---|---|---|
| 4,115,495 A * | 9/1978 | Hartitz | 264/567 |
| 4,251,591 A * | 2/1981 | Chi | 428/316.6 |
| 4,392,862 A * | 7/1983 | Marsan et al. | 604/366 |
| 4,613,533 A | 9/1986 | Loomis et al. | |
| 4,618,384 A * | 10/1986 | Sabee | 156/205 |
| 4,739,012 A | 4/1988 | Hagman | |
| 5,264,280 A | 11/1993 | Chundury et al. | |
| 5,374,680 A | 12/1994 | Chundury et al. | |
| 5,385,781 A | 1/1995 | Chundury et al. | |
| 5,799,704 A * | 9/1998 | Andre | 138/137 |
| 5,938,648 A * | 8/1999 | LaVon et al. | 604/358 |
| 6,465,104 B1 * | 10/2002 | Krebs et al. | 428/423.1 |

* cited by examiner

*Primary Examiner*—Elena Tsoy
(74) *Attorney, Agent, or Firm*—Rankin, Hill, Porter & Clark LLP

(57) ABSTRACT

The present invention provides a multilayer polymer structure including an inner structural layer (A) of a rigid polymer composition, an intermediate or tie layer (B) of a polymer composition including a thermoplastic polyurethane, and an exposed or surface layer (C) of a polymer composition including a thermoplastic elastomer, which is preferably a partially cross-linked chlorinated olefin interpolymer alloy. Layer (B) is disposed between and bonded to layers (A) and (C). Preferably, layer (C) and layer (B) are bonded to layer (A) under pressure, at a temperature at which both the layer (C) and layer (B) are at or near their respective melting or softening points, but layer (A) is maintained at a temperature at which it remains dimensionally stable. Multilayer polymer structures according to the invention can be formed into decking material, conveyor belting and a variety of other products.

9 Claims, 1 Drawing Sheet

MULTILAYER POLYMER STRUCTURE

BACKGROUND OF THE INVENTION

1. Field of Invention

The present invention relates to a multilayer polymer structure and, more particularly, to a multilayer polymer structure including a rigid thermoplastic polymer structural layer, a thermoplastic polyurethane tie layer and a thermoplastic elastomer surface layer, articles formed from the multilayer polymer structure and methods of making the same.

2. Description of Related Art

A layer of synthetic rubber or some other elastomeric material (hereinafter generally referred to as "rubber") is sometimes bonded to one or more exterior surfaces of articles formed of rigid thermoplastic polymers such as, for example, vinyl halide polymers, polycarbonates, acrylonitrile-butadiene-styrene polymers, acrylic-styrene-acrylonitrile polymers, polyesters and blends of the foregoing. The surface layer of rubber provides a soft, durable texture to the article and the rigid thermoplastic polymer provides structural strength to the article. Depending upon the configuration of the article, the surface layer of rubber can be bonded to a rigid thermoplastic polymer by mechanical bonding, by means of an applied fluid adhesive, by melt-bonding/chemical-bonding or by a combination of any of the above.

Mechanical bonding relies on a combination of maximizing the surface contact between the rubber surface layer and the underlying rigid thermoplastic polymer structure and designing the interface between the two materials so as to increase the opportunities for the soft rubber material to either partially or completely encapsulate or to flow through openings in the article formed of the rigid thermoplastic polymer. Mechanical bonding is sometimes an effective means of bonding rubber to rigid thermoplastic structures, but can only be used when the design of the particular article permits.

Adhesive bonding involves the application of fluid adhesives to the rigid thermoplastic article by spraying, brushing or dipping. It is often a two or more step operation. First, a primer that sticks well to the rigid thermoplastic substrate is applied, followed by a coating of an adhesive that will adhere to the rubber layer and primer layer, followed by one or more heat applications to dry/set/cure the primer layer and/or adhesive layers. The surface layer of rubber is then applied to the adhesive-coated rigid member at ambient or elevated temperatures, depending on the nature of the adhesive employed.

In addition to being a multi-step operation, adhesive bonding often requires the use of solvents, which can present handling and disposal issues. Application of fluid adhesives is usually expensive, messy, time-consuming, labor-intensive, and energy-intensive. In addition, depending upon the solvent or solvents used, there may also be other disadvantages such as odor, flammability; containment of volatile organic compounds, and high scrap rates. For these and other reasons, the application of fluid adhesives to the rigid component is the least-desirable alternative to achieve a bonded composite article.

Melt bonding involves bringing the soft rubber component and rigid thermoplastic polymer component together under mating pressure, wherein both of the components are in the melt state. Strictly speaking, true melt bonding requires that both of the components be melted at the interface and that they be sufficiently chemically and physically compatible such that they fuse together upon cooling. The chemical compatibility can best be expressed in terms of having similar values for surface energy and/or solubility parameter. In simple terms, similar materials tend to have a mutual affinity and a greater propensity to adhere to one another than do dissimilar materials.

Chemical bonding is similar in approach to melt bonding, but relies on a strong chemical attraction force between the melted soft rubber component and the rigid thermoplastic polymer component, and does not require that the rigid thermoplastic polymer component be at or above its melting point. Chemical bonding, as well as melt bonding, is generally preferred over the alternatives because it requires much less design engineering and eliminates all of the objections presented by fluid adhesive bonding processes.

Rigid polyvinylchloride ("rigid PVC") is, by far, the most widely used rigid thermoplastic polymer to which rubber surface layers are bonded. Some rubber compositions have melting points and chemical structures that are similar to rigid PVC. Thus, melt-bonds formed when both components are brought together under pressure at or very near their respective melt temperatures tend to be excellent.

It will be appreciated that in the production of some articles, the rigid PVC component must first be fully cooled to lock in its desired dimensions before the surface layer of rubber is applied. Under these circumstances, it is not possible to form a satisfactory melt-bond between the rubber surface layer and the rigid PVC structural component because the rigid PVC component cannot be heated under pressure at or very near its melt temperature without detrimentally changing its desired dimensions. In many situations, it is not possible to co-extrude the rubber surface layer with the rigid PVC layer because the coefficient of friction of the rubber is too high to allow the cooling composite article to slide through one or more vacuum sizing blocks. A method is needed whereby a soft rubber surface layer can be bonded to a structure formed of a rigid thermoplastic polymer without adversely affecting the dimensional integrity of the rigid thermoplastic structure.

BRIEF SUMMARY OF THE INVENTION

The present invention provides a multilayer polymer structure comprising a structural layer (A) of a rigid polymer composition, an intermediate layer (B) of a polymer composition comprising a thermoplastic polyurethane and a topcoat layer (C) of a polymer composition comprising a thermoplastic elastomer. Layer (B) is disposed between and bonded to layers (A) and (C). In the preferred embodiment of the invention, the rigid polymer composition comprises rigid PVC, the thermoplastic polyurethane is an aromatic polyester thermoplastic polyurethane and the thermoplastic elastomer is a partially cross-linked chlorinated olefin interpolymer alloy.

The present invention also provides a method of forming a multilayer polymer structure. The method comprises applying the intermediate layer (B) of a polymer composition comprising a thermoplastic polyurethane in a molten or plastic state to a dimensionally stable structural layer (A) formed of a rigid polymer composition and applying a topcoat layer (C) of a polymer composition comprising a thermoplastic elastomer to layer (B) while layer (B) is still in the molten or plastic state.

The method of the present invention is particularly suitable for forming extruded articles such as composite rigid PVC outdoor deck planking, which must retain its dimensional stability during the application of the thermoplastic elastomer surface layer (C). In such an embodiment, the structural layer (A) typically comprises an exposed surface of a dimensionally stable hollow structural member, such as an extruded rigid PVC plank whose dimensions have been fixed by cooling the extruded material as it passes through a vacuum-sizing block. The intermediate layer (B) and surface layer (C) are then applied to the structural layer (A) simultaneously using a coextrusion die, or sequentially using separate extrusion dies.

Adhesion of the thermoplastic elastomer surface layer (C) and intermediate layer (B) to the structural layer (A) is excellent. Application of the thermoplastic elastomer surface layer (C) does not adversely affect the dimensional stability of the structural layer (A). And, the process can be practiced using conventional equipment, and does not require the use of solvents.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
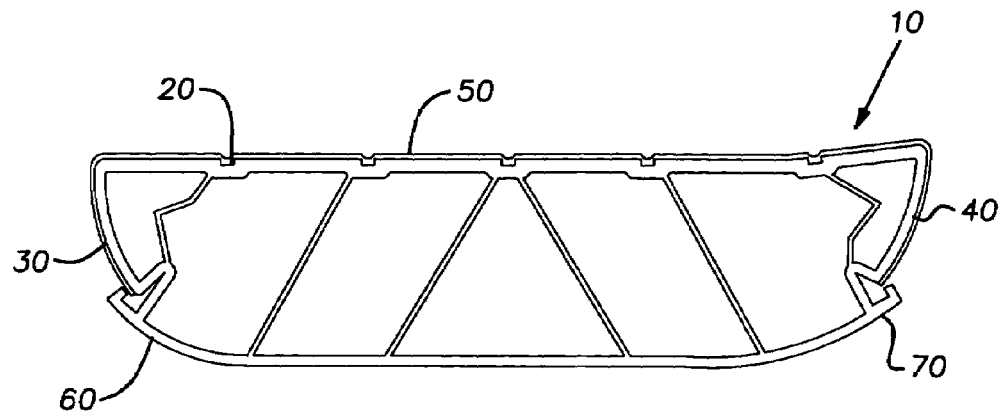
FIG. 1 is a schematic drawing of a cross-section of a hollow rigid PVC outdoor decking plank having a thermoplastic elastomer topcoat layer applied thereto by coextrusion.

The present invention provides a multilayer polymer structure comprising a rigid thermoplastic polymer structural layer (A), a thermoplastic polyurethane tie or intermediate layer (B) and a thermoplastic elastomer surface layer (C). Each of the layers comprising the multilayer structure is separately discussed in detail below.

Layer (A)

The multilayer polymer structure according to the invention has an inner, base or structural layer (A). This layer comprises a rigid polymer. Throughout the instant specification and in the appended claims, the term "rigid polymer" refers to any polymer that exhibits a Shore "D" hardness of 40 or higher according to ASTM Standard D2240 and/or that exhibits a flex modulus above 15,000 psi according to ASTM Standard D790. Preferred rigid polymers for use in the invention comprise one or more polymers selected from the group consisting of vinyl halide polymers, polycarbonates, acrylonitrile-butadiene-styrene polymers, acrylic-styrene-acrylonitrile polymers, polyesters and blends of the foregoing. Polyvinylchloride, and particularly rigid polyvinylchloride, is presently most preferred for use in the invention.

The structural or base layer (A) is preferably extruded or injection molded, and may include reinforcing materials such as fillers, fibers, wound filaments, metals and fabrics. The structural layer (A) provides the mechanical strength to the molded article.

Preferably, the structural or base layer (A) is dimensionally stable before the tie layer (B) is applied. Throughout the instant specification and in the appended claims, the term "dimensionally stable" means that the rigid thermoplastic polymer has cooled to a temperature sufficiently below its melting point that it will retain its desired dimensions (i.e., resist deformation) when exposed to subsequent heat and pressure during the application of layers (B) and (C).

In some applications, such as in the fabrication of architectural outdoor deck planking for example, the structural layer (A) comprises an exposed surface of a dimensionally stable hollow structural member. The dimensions of the hollow structural member are defined and stabilized by passing an extruded, rigid thermoplastic polymer composition through one or more vacuum-sizing blocks, which are known in the art. Low exterior pressure pulls the sides or walls of the hollow structure against the inner sides or walls of the vacuum-sizing block as the extruded rigid thermoplastic polymer composition passes through the vacuum-sizing block and cools to a temperature sufficiently below its melting point that it retains its desired dimensions. Rigid PVC is sufficiently self-lubricating that will pass through vacuum-sizing blocks without additional lubrication.

Layer (B)

The multilayer polymer structure according to the invention also contains a layer (B) that is bonded to structural layer (A) and to thermoplastic surface layer (C). Layer (B), which is sometimes referred to herein as an intermediate layer or a tie layer, comprises a polymer composition comprising a thermoplastic polyurethane ("TPU") polymer. Layer (B) is applied to the structural layer (A) after the structural layer (A) has cooled to a temperature where it retains its desired dimensions.

Virtually any TPU polymer can be used in the invention, but TPU polymers having low softening/melting temperatures (i.e., below about 180° C.) are preferred. Presently, aromatic polyester TPU polymers are the most cost-effective, with aromatic polyether TPU polymers being slightly more expensive. Aliphatic polyester TPU polymers and aliphatic polyether TPU polymers are much more expensive with no offsetting benefits.

The TPU polymer can be applied from a melt, either by extrusion or injection molding. Extrusion can be accomplished using a second extruder equipped with a separate die or using two extruders connected to the same die. In the latter setup, the intermediate TPU polymer layer (B) and the thermoplastic elastomer surface layer (C) can be laid down on the substrate sequentially, or the two melts can be brought into contact with each other within the die to form a two layer melt, which can then be applied to the structural layer (A) in one step.

Alternatively, layer (B) can be applied from a solution in tetrahydrofuran or a blend of tetrahydrofuran and methyl ethyl ketone, provided that all of the solvent is driven off before the application of the thermoplastic elastomer surface layer (C). It will be appreciated that the use of solvents to apply the tie layer (B) is substantially less preferred than application of the layer (B) using melt-processing techniques.

As noted above, virtually any TPU polymer with low melting characteristics will work, but aromatic polyester TPU polymers have been determined to be the most cost-effective candidates. The preferred TPU polymer materials for use in the invention are available from Noveon, Inc. of Cleveland, Ohio under the ESTANE® trade designation. The presently most preferred TPU polymer material for use in the invention is sold by Noveon, Inc. under the trade designation ESTANE® 5713. This particular grade has the desired low melting characteristics and can be used in heat-activated adhesives. The heat activation temperature for this TPU polymer is 54° C.

Tie layer thicknesses should be such that the surface is uniformly covered. Effective TPU film thicknesses can range from a few mils to 25 mils, or more. Thicknesses of from about 1 mil to about 25 mils are usually appropriate, depending on the hardware limitations and the application requirements. Excessive tie layer thicknesses add to cost to the finished article and do not appreciably increase bond strength.

Layer (C)

The multilayer polymer structure according to the invention also contains a layer (C), which, in most applications, is the exposed surface layer or topcoat layer. The layer (C) comprises a polymer composition comprising a thermoplastic elastomer. The thermoplastic elastomer must have sufficient polarity in order to hot-bond to the intermediate TPU polymer layer (B). It should also provide sufficient resistance to weather and oil-borne debris in order to be used in outdoor applications.

The assignee of the present application, Advanced Polymer Alloys, a division of Ferro Corporation, manufactures and sells several grades of thermoplastic elastomers under the ALCRYN® trademark. These thermoplastic elastomers comprise a partially cross-linked chlorinated olefin interpolymer alloy that exhibit sufficient polarity (due to the presence of both chlorine and acrylic functionality in the alloy) to hot-bond to the intermediate TPU polymer layer (B) and also sufficient resistance to weather and oil-borne debris. The constituents of these thermoplastic elastomer compositions and the methods by which they can be prepared are described in detail in Loomis, et al., U.S. Pat. No. 4,613,533, and Hagman, U.S. Pat. No. 4,739,012, which are both hereby incorporated by reference in their entirety. The ALCRYN® brand of thermoplastic elastomer material, which is also sometimes referred to as "Melt-Processible Rubber™" (MPR), is particularly well suited for use in the invention.

Although partially cross-linked chlorinated olefin interpolymer alloys are most preferred, other thermoplastic elastomers can also be used. Suitable thermoplastic elastomers include, for example, thermoplastic olefins, chlorinated rubbers, ionomers, and block copolymers. The critical limitation is for the thermoplastic elastomer is that it must be able to hot-bond to the TPU tie layer (B).

The thermoplastic elastomer can be applied to the tie layer (B) in the form of a melt, either by extrusion or injection molding. As noted above, extrusion can be accomplished using a second extruder equipped with a separate die or through the use of two extruders connected to the same die. In the latter setup, the TPU polymer tie layer (B) and the thermoplastic elastomer surface layer (C) can be laid down in molten form on the structural layer (A) sequentially, or layers (B) and (C) can be brought into contact with each other within the die to form a two layer melt, which is then applied to the structural layer (A) in one step.

The present invention can be used to produce a variety of multi-component articles such as, for example, hoses formed of reinforced polymers. In fabricating such a hose according to the invention, a dimensionally sized and cooled reinforced tube assembly is first over-extruded with a TPU tie layer using a cross-head die, and then immediately followed by an over-extrusion of a thermoplastic elastomer cover stock before the TPU layer has had sufficient time to cool. Hoses formed in accordance with the invention are suitable for various types of water and hydraulic pressure hoses, depending on the composition of the rigid thermoplastic polymer and reinforcement used.

The method of the invention is also useful for forming conveyor belting. First, a layer fiber reinforced thermoplastic polymer is formed and dimensionally sized. Next a layer of TPU material is applied to the fiber reinforced layer, and then a top layer of thermoplastic elastomer is applied to the TPU layer before it has had sufficient time to cool.

The thickness of the thermoplastic elastomer layer is not per se critical, and will vary according to the particular application. In outdoor decking applications, the thermoplastic elastomer layer will typically have a thickness of from about 40 mils to about 50 mils, but other thicknesses can be used.

The following examples are intended only to illustrate the invention and should not be construed as imposing limitations upon the claims.

COMPARATIVE EXAMPLE 1

Not an Embodiment of the Invention

2"×8" planking was formed by coextruding: (1) a main section of rigid PVC through a 105 mm Krauss-Maffei twin conical extruder and; (2) a top coat section of rigid PVC through an 88 mm Krauss-Maffei twin conical extruder at a rate of 550 pounds per hour. The main section of rigid PVC was formulated of a general purpose PVC homopolymer suspension resin that was compounded with levels of conventional heat stabilizers and titanium dioxide filler typically used in the fabrication of rigid PVC products intended for long-term outdoor use. The top coat section of rigid PVC was also formulated of a general purpose PVC homopolymer suspension but was compounded with higher levels of titanium dioxide filler and additional UV stabilizers at levels well known in the art to impart improved weather resistance for long-term continuous horizontal exposure in outdoor applications. Additional processing parameters are shown in Table 1 below:

TABLE 1

| Parameter | 105 mm Extruder | 88 mm Extruder |
| --- | --- | --- |
| Zone 1 Temp (° F.) | 355 | 375 |
| Zone 2 Temp (° F.) | 350 | 365 |
| Zone 3 Temp (° F.) | 350 | 340 |
| Zone 4 Temp (° F.) | 330 | 345 |
| Adapter Temp (° F.) | 330 | 330 |
| Die Temp (° F.) | 365 | 365 |
| PVC-Fusion Temp (° F.) | 320 | 330 |
| Oil Temp | 310 | 310 |
| Amps | 50 | 24 |
| RPM | 19.4 | 25.2 |
| Feed | 49.5 | 20.2 |

TABLE 1-continued

| Parameter | 105 mm Extruder | 88 mm Extruder |
| --- | --- | --- |
| Pressure (psi) | 1538 | 4670 |
| Melt Temperature | 371 | 370 |

As the rigid plank exited the die, it passed through a vacuum-sizing block, which was operating at a vacuum of 17 bars, to "pull out" the rigid plank to the appropriate dimensions. If a vacuum-sizing block had not been used, the sharply rectangular wall structure of the plank would have sagged and/or collapsed as the rigid PVC polymer cooled. The rigid PVC melt alone was sufficiently self-lubricating to allow the rigid plank to be pulled through the vacuum-sizing block without jamming. After exiting the vacuum-sizing block, the rigid plank was passed through a 30' water bath for cooling. Air was then blown on the surface and sides of the formed plank to remove any remaining water.

COMPARATIVE EXAMPLE 2

Not an Embodiment of the Invention

It was desired to apply a thermoplastic elastomer layer to the top surface and a portion of the sides of the rigid PVC plank formed in Comparative Example 1 in order to provide a heavy, rubbery, anti-slip, anti-static wear layer which would also be very resistant to all aspects of weather, dirtying and physical abuse for many years of outdoor service. The fully bonded thermoplastic elastomer surface layer needed to be easy to clean and maintain, and to be easy to formulate in a variety of stable colors and shades.

Initial attempts to apply a thermoplastic elastomer surface layer to the rigid PVC planking using a typical coextrusion die were unsuccessful. The melt bond formed between the thermoplastic elastomer and the rigid PVC planking material was excellent, but the high coefficient of friction provided by the thermoplastic elastomer surface layer prevented the extruded planking material from sliding through the vacuum-sizing block, causing jams and line shut-downs.

FIG. 1 is a schematic drawing of a cross-section of a hollow deck plank 10 having a top surface 20 and side surfaces 30, 40 formed according to Comparative Example 2. A surface layer 50 of thermoplastic elastomer was coextruded in a primary die so as to cover the top surface 20 and a portion of the side surfaces 30, 40 of the hollow deck plank 10 before it passed through a vacuum-sizing block. The high coefficient of friction provided by the thermoplastic elastomer surface layer 50 caused the hollow deck plank 10 to jam in the vacuum-sizing block, distorting the dimensions of the hollow deck plank, particularly at the corners 60, 70. Attempts to overcome this problem by adding lubricants and other additives to the thermoplastic elastomer composition or by spraying the surface of the extruded thermoplastic elastomer surface layer with lubricants prior to entering the sizing blocks proved to be ineffective.

COMPARATIVE EXAMPLE 3

Not an Embodiment of the Invention

In an effort to overcome the problems discussed in Comparative Example 2 above, the application of the thermoplastic elastomer surface layer was moved to a point in the plank fabrication process beyond the sizing of the rigid PVC plank. The layer of thermoplastic elastomer was then applied to the cooled, dimensionally sized, PVC planking material without additional heating. Bond formation was determined to be inadequate between the thermoplastic elastomer layer and the rigid PVC surface.

Figure 2:
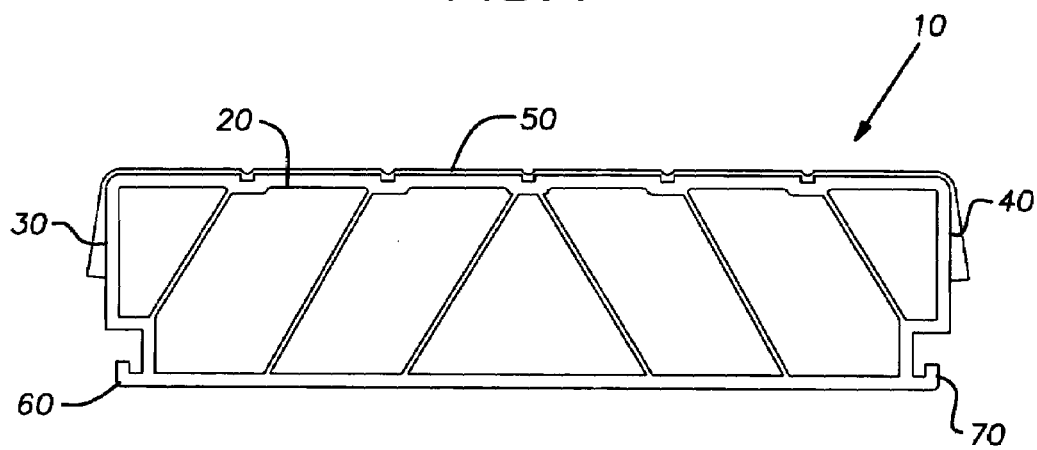
FIG. 2 is a schematic drawing of a cross-section of a hollow rigid PVC outdoor decking plank having a thermoplastic elastomer topcoat layer applied thereto by extrusion lamination.

FIG. 2 is a schematic drawing of a cross-section of a hollow deck plank 10 having a top surface 20 and side surfaces 30, 40 formed according to Comparative Example 3. A surface layer 50 of thermoplastic elastomer was applied by extrusion lamination to cover the top surface 20 and a portion of the side surfaces 30, 40 of the hollow deck plank 10 after the hollow deck plank 10 had passed through a vacuum-sizing block. In an effort to improve bonding, the surface layer 50 of thermoplastic elastomer was exposed to intense surface heating to maximize the potential bonding of the extruded thermoplastic elastomer layer to the rigid PVC plank surfaces 20, 30 and 40. Pressure rollers immediately beyond the thermoplastic elastomer die ensured good physical contact between the rigid plank and the hot thermoplastic elastomer layer. Unfortunately, acceptable bond strength was not achieved, even when the dimensionally sized plank was heated to the point that it was physically distorted, as is evident in FIG. 2, particularly at the corners 60, 70.

COMPARATIVE EXAMPLE 4

Not an Embodiment of the Invention

A layer of thermoplastic polyurethane was co-extruded with the rigid PVC in the primary coextrusion die. The melt bond formed between the TPU layer and the rigid PVC planking material was excellent, but the high coefficient of friction provided by the TPU layer prevented the extruded planking material from sliding through the vacuum sizing blocks, causing jams and line shut-downs. Attempts to overcome this problem by adding lubricants and other additives to the TPU layer or by spraying the TPU layer with lubricants prior to entering the sizing blocks proved to be ineffective.

EXAMPLE 5

Preferred Embodiment of the Invention

As in Comparative Example 3, the TPU layer extrusion operation was moved to a point in the plank extrusion process beyond the vacuum-sizing block for the rigid PVC plank. However, no plank surface heating was employed. The TPU (ESTANE® 5713) was pre-dried for 6 hours at 120° F. and was applied to the top and a portion of the side surfaces of the rigid PVC plank using a Davis-Standard 1.5 inch extruder (equipped with a single general purpose screw) through a 6" sheet die at a thickness of about 0.025". The TPU processing parameters are set forth in Table 2 below:

TABLE 2

| Parameter | 1.5 in. Extruder |
| --- | --- |
| Zone 1 Temp (° F.) | 340 |
| Zone 2 Temp (° F.) | 350 |
| Zone 3 Temp (° F.) | 360 |
| Adapter Temp (° F.) | 380 |
| Die Temp (° F.) | 350 |
| Flex Tube Temp (° F.) | 375 |

TABLE 2-continued

| Parameter | 1.5 in. Extruder |
| --- | --- |
| RPM | 11 |
| Amps | 3.1 |

Immediately after the intermediate TPU layer was applied, a thermoplastic elastomer topcoat layer (AL-CRYN® 2080NC) was applied to the hot intermediate TPU layer by coextrusion using an Actual & Grueber extruder (equipped with a single general purpose screw) through a 6" sheet die at a thickness of about 40 to about 50 mils. The thermoplastic elastomer processing parameters are set forth in Table 3 below:

TABLE 3

| Parameter | 1.5 in. Extruder |
| --- | --- |
| Zone 1 Temp (° F.) | 375 |
| Zone 2 Temp (° F.) | 375 |
| Zone 3 Temp (° F.) | 385 |
| Adapter Temp (° F.) | 385 |
| Die Temp (° F.) | 390 |
| Flex Tube Temp (° F.) | 390 |
| Melt Temp (° F.) | 395 |
| RPM | 11 |
| Amps | 3.1 |

A roller was applied to the top of the rubberized plank as it exited the coextrusion die. Although it was not done in this instance, a textured roller could have been used to emboss a desired texture into the surface layer during the rolling operation. The roller provided pressure to smooth any surface imperfections and to ensure good mating contact between the topcoat layer (C) and the TPU tie-layer (B). The line speed was 5 feet per minute. Subsequent operations included cutting the plank into the desired length, cleaning with air and wrapping the plank for shipping.

Bond formation was immediate and continued to improve in the 24 hours after the laminate was formed. Bond strength was determined by measuring 90° peel adhesion in accordance with the procedures set forth in the ASTM D-429 standard. The average bond strength for three samples was determined to be 35.3 pounds (force) per inch width ("ppi"). Generally, any value in excess of 20 ppi is considered to be excellent and fully acceptable for outdoor decking applications.

Figure 3:
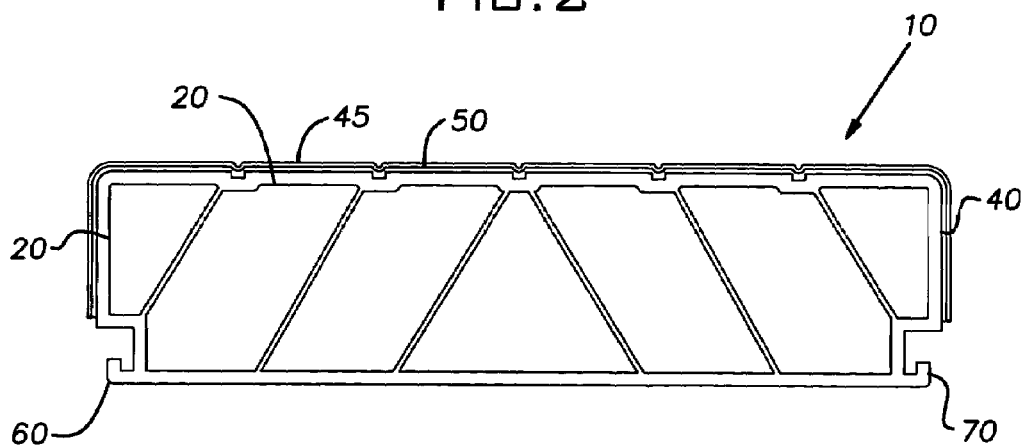
FIG. 3 is a schematic drawing of a cross-section of a hollow rigid PVC outdoor decking plank having a TPU intermediate layer and a thermoplastic elastomer topcoat layer applied thereto in accordance with the invention.

FIG. 3 is a schematic drawing of a cross-section of a hollow rigid PVC outdoor decking plank 10 having a top surface 20 and side surfaces 30, 40 formed according to Example 5. A tie layer 45 of TPU polymer is bonded to the top surface 20 and a portion of side surfaces 30, 40, and a surface layer 50 of thermoplastic elastomer is bonded to the tie layer 45. As is evident in FIG. 3, the thermoplastic elastomer surface layer 50 is exceptionally well adhered to the hollow rigid plank 10, and the dimensions of the plank are exactly as desired, even in the corners 60, 70.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of forming a multilayer polymer structure comprising:

applying an intermediate layer (B) of a polymer composition comprising a thermoplastic polyurethane in a molten or plastic state to a dimensionally stable structural layer (A) formed of a rigid polymer composition comprising one or more polymers selected from the group consisting of vinyl halide polymers, polycarbonates, acrylonitrile-butadiene-styrene polymers, acrylic-styrene-acrylonitrile polymers, polyesters and blends of the foregoing; and applying a topcoat layer (C) of a polymer composition comprising a thermoplastic elastomer to layer (B) while layer (B) is still in the molten or plastic state.

2. The method according to claim 1 wherein the thermoplastic elastomer comprises a partially cross-linked chlorinated olefin interpolymer alloy.

3. The method according to claim 2 wherein the rigid polymer composition comprises polyvinylchloride.

4. The method according to claim 3 wherein the thermoplastic polyurethane comprises an aromatic polyester thermoplastic polyurethane.

5. The method according to claim 1 wherein layer (B) has a thickness of from about 1 mil to about 25 mils.

6. The method according to claim 1 wherein layer (B) and layer (C) are applied simultaneously to layer (A) using a coextrusion die.

7. The method according to claim 1 wherein layer (B) is applied to layer (A) and then layer (C) is separately applied to layer (B).

8. The method according to claim 1 wherein layer (A) comprises an exposed surface of a hollow structural member that has been dimensioned using a vacuum-sizing block.

9. A method of forming a multilayer polymer structure comprising:

applying an intermediate layer (B) of a polymer composition comprising a thermoplastic polyurethane in a molten or plastic state to the exposed surface of a hollow extruded decking plank (A) that has been dimensioned using a sizing block, the decking plank being formed of a rigid polymer composition comprising one or more polymers selected from the group consisting of vinyl halide polymers, polycarbonates, acrylonitrile-butadiene-styrene polymers, acrylic-styrene-acrylonitrile polymers, polyesters and blends of the foregoing; and applying a topcoat layer (C) of a polymer composition comprising a thermoplastic elastomer to layer (B) while layer (B) is still in the molten or plastic state.

* * * * *